June 10, 1924.                                                                 1,497,388
E. M. STERLING
METHOD OF AND APPARATUS FOR INDICATING THE ELECTRICAL CONDITION OF A CELL
Filed Nov. 3, 1922
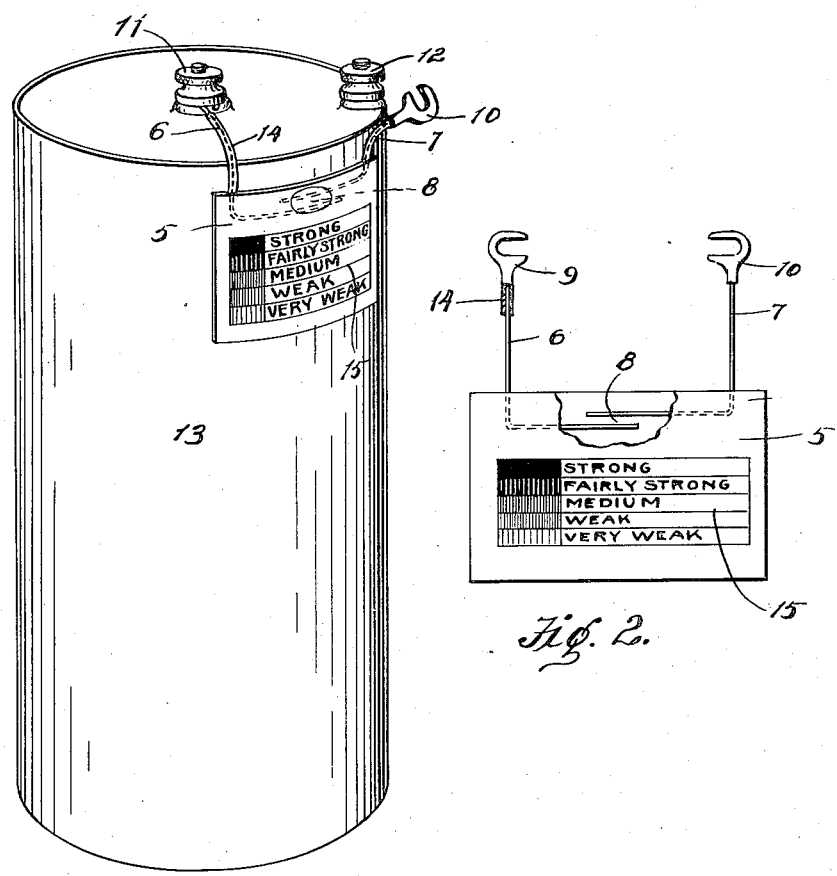
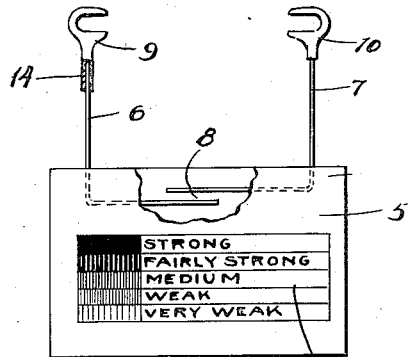
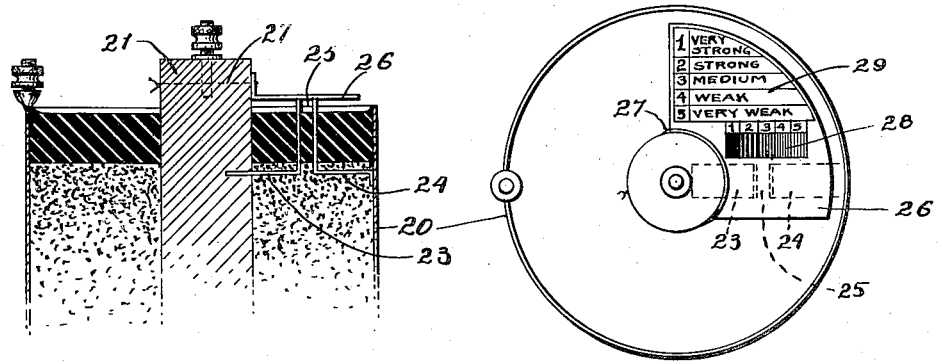
INVENTOR.
Edward M. Sterling
BY Harry D. Nims, Martin T. Fisher
ATTORNEYS.

Patented June 10, 1924.

1,497,388

UNITED STATES PATENT OFFICE.

EDWARD M. STERLING, OF NEW YORK, N. Y.

METHOD OF AND APPARATUS FOR INDICATING THE ELECTRICAL CONDITION OF A CELL.

Application filed November 3, 1922. Serial No. 598,759.

*To all whom it may concern:*

Be it known that I, EDWARD M. STERLING, a citizen of the United States, and resident of New York city, in the county of New York and State of New York, have invented a new and useful Improvement in Methods of and Apparatus for Indicating the Electrical Condition of a Cell, of which the following is a specification.

This invention is a method of and apparatus for indicating the electrical condition of a primary or secondary cell.

The ordinary purchaser or user of an electric cell, such as the ordinary "dry" cell, has no ready means for ascertaining the strength of the cell; a voltmeter is probably the best instrument for this purpose, but this instrument is expensive, and not usually available. The object of this invention is to provide a simple and inexpensive method and device for readily giving to the user of the cell an approximate indication of the electrical condition of the cell at any time. Furthermore, the indicating device being simple and inexpensive, is attached to, or sent along with, each single cell, so that the strength of the cell may be readily tested at the factory, in the store, or while in actual use, without the necessity of hunting up an instrument for the purpose.

According to this invention, the current from the cell is caused to pass through an indicator which will show various colors with various current strengths. The preferred indicator is phenolphthalein, and it is preferably carried by a piece of absorbent paper. The current is caused to pass through the paper and indicator by moistening part of the paper and allowing the current from the cell to flow through this moistened spot for a short time, sufficient to give a definite color indication.

More specifically, the paper carrying the phenolphthalein or other indicator may have permanently attached thereto two wires, fairly close together but not in electrical contact; when the space between the two wires is moistened and the wires are respectively connected to the two electrodes of the cell, the current will pass through the moistened spot and give a color indication corresponding to the strength of the cell.

In a modified form, the cell may carry two contact elements placed adjacent one another but out of electrical contact, such elements being respectively connected to the electrodes of the cell. The moistened spot on the paper that is impregnated with the phenolphthalein is pressed onto the two contact elements, and the current passes through this spot and changes the color of the indicator.

Referring now to the drawings, illustrating two embodiments of the invention, Fig. 1 is a perspective view of the indicating device as applied to the cell; Fig. 2 is a view of the indicating device detached; Fig. 3 is a sectional view of the dry cell, illustrating a modification of the invention; and Fig. 4 is a top view of the cell shown in Fig. 3.

In Figs. 1 and 2, a piece of paper or other carrier, indicated at 5, has attached to it by a suitable means a pair of wires 6 and 7, the adjacent ends of which overlap but do not touch, leaving a space 8 between the wires. The portion of the carrier 5 around the space 8 is impregnated with an indicator, which will change color when an electric current is passed therethrough. The preferred indicator is phenolphthalein.

The wires 6 and 7 have clips 9 and 10 attached thereto for engagement with the binding posts 11 and 12 of the cell 13. As indicated at 14 in Fig. 1, the wires are preferably insulated.

In order to get a color indication, the clips 9 and 10 are attached to the binding posts of the cell, and the spot 8 is moistened, as with a moistened finger, whereupon the current will pass through the moistened spot and cause the indicator to change color.

In order to interpret the color change, a color chart 15 is printed on the carrier 5; a comparison of the color obtained at the spot 8 with the color chart will give an indication of the approximate strength of the cell.

In Fig. 3, the zinc can of an ordinary dry cell is indicated at 20, the carbon electrode at 21 and the pitch seal at 22. Tightly fitted in a slot in the carbon electrode is a piece of sheet metal 23, which is bent to extend upwardly through the pitch seal and a short way out of the cell. A similar piece of sheet metal 24 is attached to the inside of the zinc can and extends out of the cell adjacent the piece 23, but out of contact therewith. The upper edges of the pieces 23 and 24 define a space 25 analogous to the space 8, Fig. 2.

The carrier for the indicator is shown at 26, and is attached to the carbon electrode by a fastening 27. The carrier is provided with a color chart 28 and an interpretative chart 29 printed thereon. That part of the carrier that is over the space 25 is impregnated with an indicator such as phenolphthalein which will change color upon the passage of current. In order to test the cell, a spot on the carrier just over space 25 is moistened and pressed down onto the elements 23 and 24, whereupon current will flow through this spot and give a color indication.

While certain specific embodiments of the invention have been described in some detail, it should be understood that the disclosure is illustrative only and that the invention may be carried out in other ways.

I claim as my invention:—

1. The method for indicating the strength of an electric cell, comprising the passing of the current from the cell through an indicator which shows various colors with various current strengths.

2. The method for indicating the strength of an electric cell, comprising the passing of the current from the cell through a moistened carrier impregnated with an indicator which shows different colors with different current strengths.

3. The method for indicating the strength of an electric cell, comprising the passing of the current from the cell through a moistened carrier impregnated with phenolphthalein.

4. The method for indicating the electrical condition of a cell, comprising the passing of the current from the cell through a piece of absorbent material impregnated with phenolphthalein.

5. A device for indicating the strength of an electric cell, comprising a carrier impregnated with an indicator which shows various colors when subjected to currents of various strengths, having marked thereon a color chart as a standard of comparison.

6. The combination of an electric cell, and a device for indicating the current strength of the cell, comprising means for carrying an indicator which shows various colors when subjected to currents of various strengths.

7. The combination of an electric cell, two leads placed adjacent one another but out of contact, and respectively connected to the positive and negative electrodes of the cell, and a carrier, impregnated with an indicator which shows various colors when subjected to currents of various strengths, which may be placed so as to bridge the space between the two said leads.

8. A device for indicating the strength of an electric cell, comprising a piece of material impregnated with a carrier which shows various colors when subjected to currents of various strengths, said piece of material having incorporated therewith a pair of metallic conducting elements arranged adjacent to one another but out of electrical contact.

9. In combination, an electric cell, a pair of conductors attached to the respective electrodes of the cell and terminating adjacent one another but out of electrical contact, and a carrier impregnated with an indicator, adapted to be placed in contact with the said pair of conductors.

10. A device for indicating the strength of an electric cell, comprising a carrier impregnated with phenolphthalein, and means for passing the current from the cell through the carrier.

EDWARD M. STERLING.